United States Patent Office 3,810,787
Patented May 14, 1974

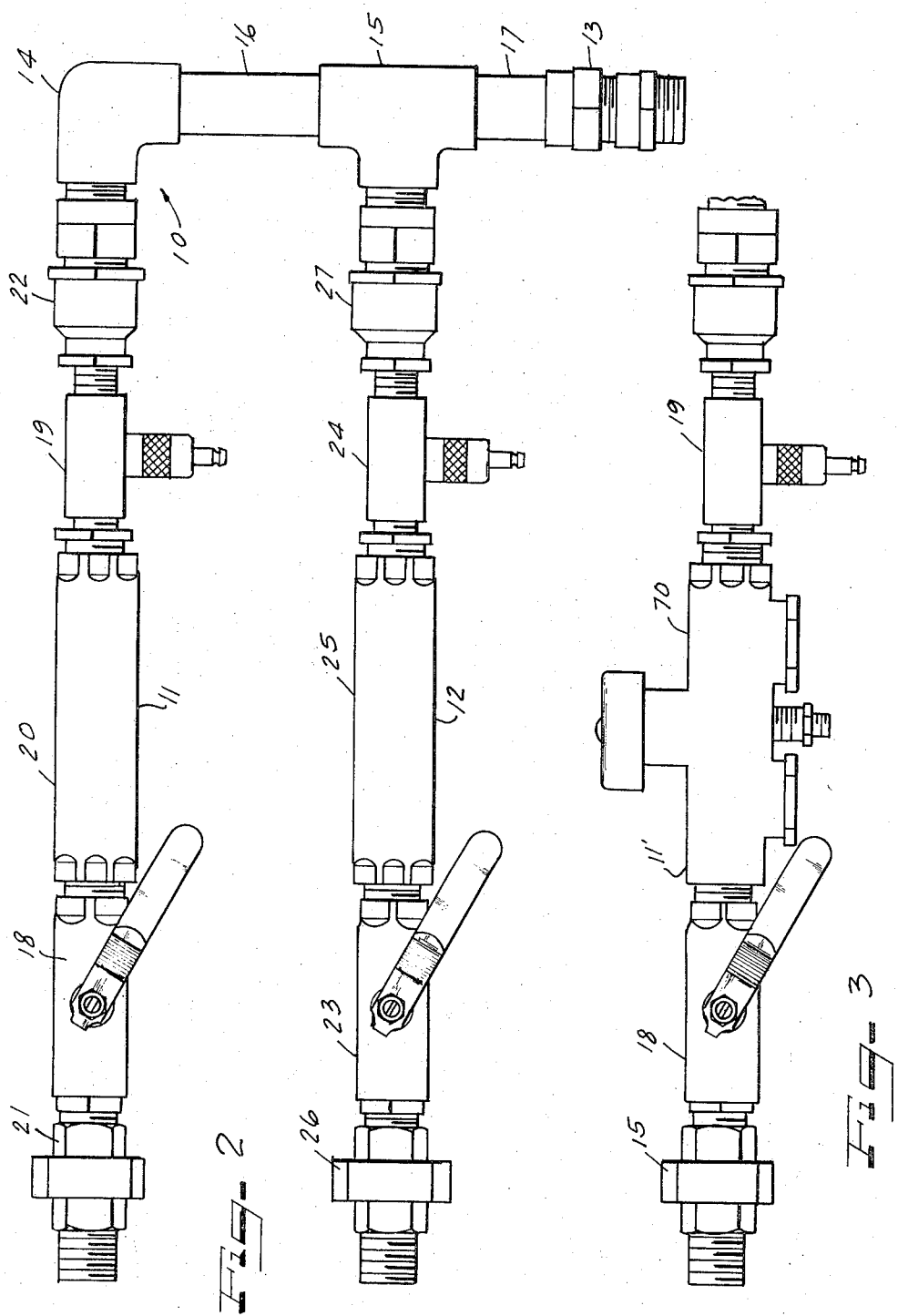

3,810,787
METHOD FOR CLEANING AND SANITIZING FOOD HANDLING EQUIPMENT
Oded Yoeli, Atlanta, and Gerald W. Gibbs, Lawrenceville, Ga., assignors to Consolidated Foods Corporation, Atlanta, Ga.
Filed Apr. 13, 1972, Ser. No. 243,778
Int. Cl. B08b 3/02, 3/08
U.S. Cl. 134—29                                    3 Claims

ABSTRACT OF THE DISCLOSURE

A method and apparatus for cleaning and sanitizing food preparation equipment by cleaning the equipment by means of spraying a mixture of hot water and cleaning agent and then sanitizing the equipment by spraying a mixture of cold water and sanitizing agent. The apparatus comprises a pair of branch conduits for connection to a source of hot water and source of cold water to a single outlet which is connected by a flexible hose or conduit to a spray nozzle. Each of the branch conduits has a valve for controlling flow in the conduit and an injector for injecting the agent into the water flowing through the branch conduits to the spray nozzle which has a central valve for shutting off the spray.

BACKGROUND OF THE INVENTION

Field of the invention

The present invention is directed to a method and apparatus for cleaning and sanitizing food processing equipment.

Prior art

Food spoilage increases with contamination of the food during processing by micro-organisms. Some micro-organisms are pathogenic such as salmonella and are harmful to the person consuming the food while other micro-organisms, even though not causing illness to the person consuming the food, cause early spoilage or destroy the taste of food.

Food such as meat, fish, fowl once slaughtered, lose their natural defense mechanisms to combat micro-organisms introduced by contamination. Thus, deterioration begins at the moment of slaughter and continues until the process of deterioration is stopped by refrigeration, freezing, cooking or other food processing techniques. Contamination of the fresh meat product usually occurs in the slaughtering or processing operations and is due to poor environmental sanitation or handling methods. In food processing areas of supermarkets, freezer locker plants and general food processers, contamination occurs from contact with unsanitized surfaces during processing such as cutting the meat, packaging the meat or during storage of the meat. While the personal hygiene of the employees of the meat department is essential to minimize contamination, one of the sources of contamination is from contact with surfaces of equipment which contain soils or dirt such as fats or juices from previous processed meat which soils are breeding grounds for micro-organisms. Thus, all processing departments utilize a daily cleanup time to reduce or try to eliminate the accumulation of the above-mentioned soils on surfaces that will contact the food being processed to reduce the contamination of food being processed.

Probably the most common method of cleaning comprises utilizing a rag, which is dipped into a bucket or container of warm water containing an amount of cleaning agent or detergent, to wipe the surfaces such as the interior of display cases, tools, work surfaces and other surfaces of the equipment being used. Many problems exist with cleaning equipment with the rag and bucket method. For example, the temperature of the cleaning solution in the bucket varies from day to day and rapidly decreases during the cleaning operation and the concentration of the cleaning agent in the solution is never constant. Changes in temperature and concentration will vary the effectiveness of the cleaning solution. Wiping surfaces with a rag tends to spread contamination from one surface to another and from one equipment to the next. Furthermore, hard to reach areas such as cracks or crevices or the inside of the protective housings of saws are usually never adequately cleaned. Thus, the method of using a rag dipped in cleaning solution to individually clean the various equipments provides an incomplete and superficial cleaning that may leave an accumulation of soil that promotes the growth of undesirable micro-organisms to contaminate food which is subsequently processed.

When food rapidly deteriorates due to improper cleaning procedures, the store loses money due to discarding food, paying refunds or selling the food at a discount. Besides monetary losses, the premature spoilage may cause the store to lose the good will of its customers.

SUMMARY OF THE INVENTION

The present invention is directed to an apparatus and method which increases the efficiency of a cleaning operation for food processing equipment by reducing the time required for cleaning and by obtaining cleaner equipment. The apparatus includes a spray device connected by a flexible conduit to an outlet which is connected by a pair of branch conduits to a source of hot water and a source of cold water. Each of the branch conduits has a shut-off valve to control flow of water therethrough and means for injecting a cleaning agent into the water flowing through the conduit to provide mixture of the water and the agent for spraying. In using the apparatus to perform the method, the valves are set to deliver a mixture of hot water and cleaning agent to the spray device for a step of washing the equipment, and then the valves are set to deliver a mixture of cold water and a sanitizing agent for a sanitizing step. Preferably each of the injecting means is adjustable to enable a variation in the amount of agent metered into the flow of water and requires a predetermined flow rate for injection to occur. The spray device is preferably provided with a control valve enabling full flow and a partial flow which is at a rate below the predetermined flow rate so that an operator can obtain a clear water rinsing spray before and after the washing step, if desired.

DESCRIPTION OF THE DRAWINGS

FIG. 2 is an enlarged view of one modification of the apparatus;

FIG. 3 is a modification of a branch of the apparatus to include a vacuum break;

DESCRIPTION OF THE PREFERRED EMBODIMENTS

Figure 1:
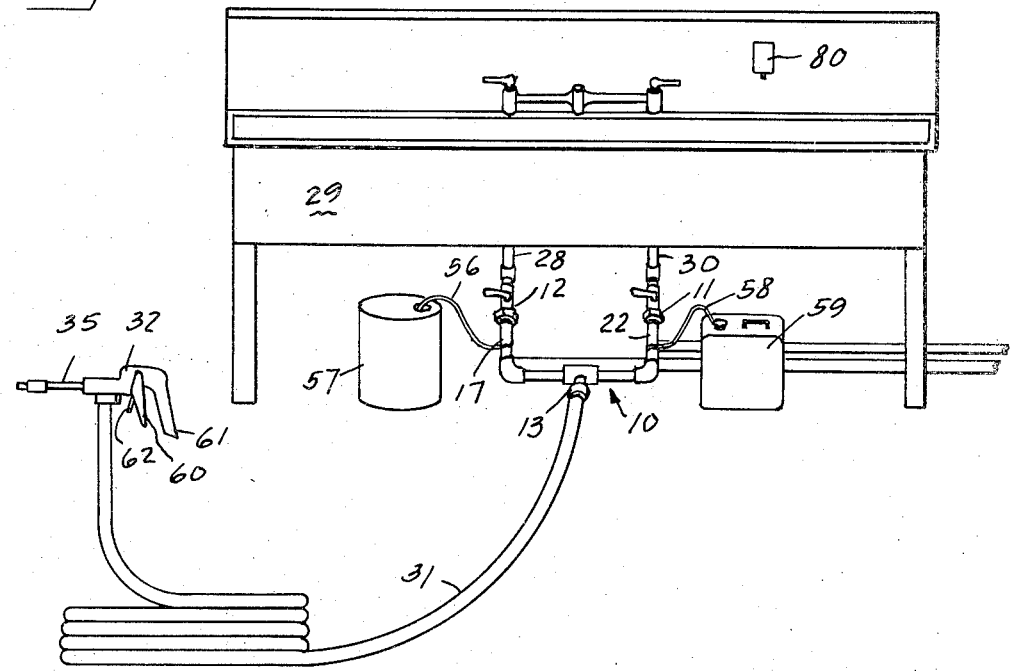
FIG. 1 illustrates the apparatus of the present invention for performing the cleaning and sanitizing method of this invention.

The principles of the present invention for performing the method are particularly useful when incorporated in an apparatus generally indicated at 10 in FIGS. 1 and 2. As illustrated in FIG. 2, the device 10 includes a first and second conduit 11 and 12 connected to a common outlet fitting 13 by fittings 14 and 15 and pipes or conduits 16 and 17.

The conduit 11 has a valve means such as a rotary ball valve 18 and means for introducing an agent such as a venturi injector 19 which are illustrated as being connected together by a length of conduit or pipe 20. The valve 18 is provided with means for connecting to a source of water such as a pipe union 21, and the injector 19 is connected to fitting 14 by appropriate fitting 22. In a similar manner, conduit 12 has a valve means such as a ball valve 23 and means for introducing an agent, such as a venturi injector 24 interconnected by a length of conduit 25. The valve 23 has connecting means such as union 26, and a fitting 27 connects the injector 24 of the conduit 12 to the fitting 15 which is a T fitting.

The length of the conduits 11 and 12 can be changed, if desired, by removing a conduit section such as 20 and 25, or by adding additional conduit sections. As illustrated in FIG. 2, the outlet fitting 13 extends from one side of the device 10; however, if desired and the spacing between the hot water and cold water permits, the outlet fitting 13 can be located between the conduits 11 and 12, as illustrated in FIG. 1.

The conduit 12 is connected by the union 26 to a source of hot water such as a hot water line 28 of a sink 29 and the branch 11 in a similar manner is connected by the union 21 to a cold water source such as a cold water pipe 30 of the sink. A flexible conduit such as a hose 31 is connected to the outlet fitting 13 and terminates in a portable spray device such as a spray gun 32 which has a valve for controlling flow through a spray nozzle.

Figure 5:
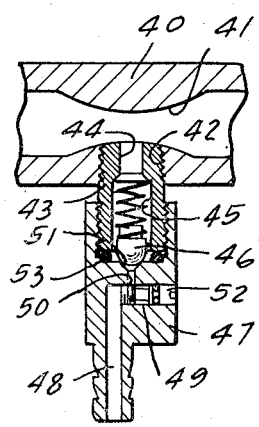
FIG. 5 is a cross-section of a venturi injector with portions in elevation for purposes of illustration.

As best illustrated in FIG. 5, each of the injector units 19 or 24 comprises a body 40 having means forming a venturi 41 with a threaded bore 42 extending to the narrow point thereof. A fitting 43 having an axial bore 44 with an enlarged portion or counterbore 45 which receives a spring biased valve member 46 is threaded into the bore 42. The member 43 has external threads for receiving a cap member 47 which has a first bore 48, a cross-bore 49, and an axial bore 50 which terminates in a valve seat 51. A metering screw or member 52 having appropriate seals is threaded into the cross-bore 49 to control or meter the flow of fluid between bores 48 and 50. As illustrated, the cap member 47 is threaded on the member 43 and the valve member 46 cooperates with a valve seat 51 to limit flow through the cap member. To provide proper sealing of the unit, various seals such as an O-ring 53 are provided.

As fluid flows through the venturi 41, a suction is created in the bore 44 to draw a fluid into and through the bores 48, 49, 50 and 44 into the fluid flow. The spring-biased valve member 46 prevents drawing a fluid into the venturi when the suction pressure is below a predetermined amount which occurs when the rate of flow in either conduit 11 or 12 is below a predetermined rate. Thus, with the desired fluid flow, an agent is sucked or injected into the venturi 41 through the bore 50 past the valve member 46. As illustrated in FIG. 1, injector 24 of the conduit 12 is connected by a hose 56 to a container 57 which contains an appropriate cleaning agent such as an all-purpose or multi-purpose detergent. In a similar manner, the injector 19 of conduit 11 is connected by a hose 58 to a container 59 containing an agent such as an iodine base sanitizing agent.

The spray gun 32 is provided with a valve means which is urged to a closed position by a spring to a no-flow position and is opened by an actuator lever 60 on a handle 61 to permit full flow through the nozzle. The lever 60 has a spring-biased stop 62 which prevents the return of the valve to the closed position and allows a flow of water through the nozzle at a reduced flow rate. When the lever 60 is pulled toward the handle 61, the stop is urged into position and a subsequent release of the lever returns the valve to the intermediate flow position (as illustrated in FIG. 1) which permits a flow rate that is below the predetermined flow rate required by either injector 19 or 24 to inject an agent into the flow of water. By manually releasing the stop, the valve of the gun 32 will return to the closed position to stop flow therethrough. The coaction of the valve member 46 of the injector 19 or 24 and the stop 62 permits a rinsing spray of water which is free of any cleaning agent.

The method of this invention comprises the steps of cleaning by spraying with a mixture of hot water and cleaning agent or detergent, and then sanitizing with a mixture of cold water and sanitizing agent. If desired, a preliminary rinsing of the equipment by using the spray gun at the intermediate position can be used before the cleaning step to wash away an accumulation of soil such as bone chips, and a similar rinsing step can be used after the cleaning step to remove the cleaning agent or detergent.

In performing the method, the operator opens the valve 23 and closes valve 18 to supply hot water to the spray gun. As the equipment is sprayed, the cleaning agent is simultaneously injected into the flow of hot water in the desired amount by the injector 24. If a change is desired in the concentration of the cleaning agent, an adjustment is made in the metering screw 52; however, the metering rate of the injector is usually adjusted and not varied unless required by changing the type of cleaning agent. After completing the cleaning step which may be for more than one equipment, the valve 23 is turned to the off position and the valve 18 is turned to the on position. Then the equipment is sprayed with a cold water solution with the sanitizing agent simultaneously injected by the injector 19. While spraying with the mixture of cold water and sanitizing agent, the spray rinses and sanitizes the equipment. After completing the sanitizing step it is desirable to flush or rinse the hose and gun by running a flow of water therethrough at the reduced rate of flow, and then close valve 18 and drain the conduit 31 and gun 32.

For best results, the hot water should be approximately 200° F. and the cleaning agent should be either an all purpose detergent or one which is highly effective for the particular type of soil present in the food handling area. Both of the injectors for the cleaning agent and sanitizing agent should be adjusted to provide the correct concentrate for the particular agent being used in each side of the device.

The best type of sanitizing agent for the device and method of the present invention is one which does not require a rinse and does not leave an after-taste on food which subsequently contacts the sanitized surface. The agent should also kill all forms of micro-organisms and not chemically react with the soils to lose its effectiveness. An iodine type or iodophor sanitizing agent provides the best results for sanitizing equipment used to prepare, handle, store and display meats. Furthermore, the iodine type or iodophors do not require an after rinse.

It should be pointed out, that no amount of sanitizing agent will sterilize soils and thus the prior cleaning steps should be thorough to insure complete elimination of any materials that could cause breeding grounds for micro-organisms to contaminate foods prior to the sanitizing steps.

One advantage of the method and apparatus of the present invention is that the cleaning fluid does not transfer contaminants from one equipment to another.

Another advantage is that hard-to-reach places such as inside meat cubing devices and power saws for cutting meats and steaks can be reached with both the cleaning and sanitizing sprays.

Figure 4:
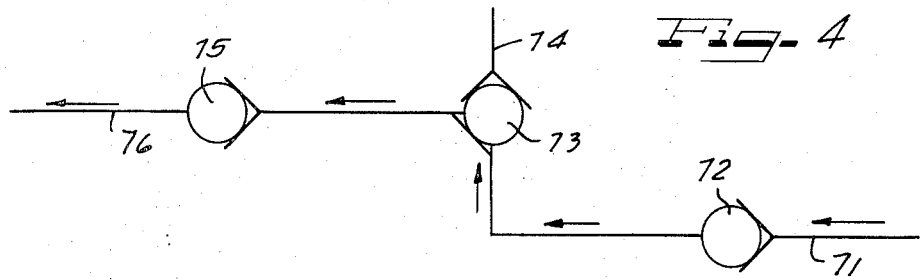
FIG. 4 is a schematic illustration of the operation of the vacuum break.

In certain instances, building regulations or codes require the presence of a vacuum breaker device to prevent the back siphoning of the cleaning agent into the water supply. As illustrated in FIG. 3, one conduit 11' is illustrated with a vacuum breaker 70 between the rotary valve 18 and injector 17 and replacing the conduit section 20. The operation of the vacuum breaker 70 is schematically illustrated in FIG. 4 in which water flowing through the valve, such as 18, enters an inlet 71 of the vacuum breaker and flows in the direction of the arrows through a check valve 72 to close a check valve 73 of a drain or vent 74 while passing through a third check valve 75 at an outlet 76 which is connected to the injector. If for some reason the pressure at the outlet 76 is greater than the pressure at the inlet 71, both the check valves 72 and 75 are forced closed and the check valve 73 will open to drain the contents in the interior of the vacuum breaker through the drain 74.

The apparatus 10, as illustrated, can be connected to the hot and cold water lines of a sink 29 provided in the work area. During use of the apparatus 10, neither of the water faucets of the sink should be used. However, upon completion of the cleanup operation of the device 10, the sink is available for other uses, such as for washing workers hands, and it is recommended that a dispenser 80 of a germicidal lotion or soap be located near the sink.

Although various minor modifications may be suggested by those versed in the art, it should be understood that we wish to include within the scope of the patent warranted hereon all such modifications as reasonably and properly come within our contribution to the art.

We claim:
1. A method of cleaning and sanitizing equipment from a single spray device, which comprises the steps of connecting the single spray device to first and second conduits, connecting the first conduit to a source of hot water, connecting the second conduit to a source of cold water, providing a flow responsive injector in each of the first conduit and the second conduit, connecting the injector of the first conduit to a body of cleaning agent, connecting the injector in the second conduit to a body of sanitizing agent, providing valve means for selectively opening each of the conduits to the spray device, controlling the flow rate through the conduits at the spray device, opening the first conduit to the spray device while closing the second conduit to the spray device, providing a flow through the spray device from the source of hot water through the first conduit at a first flow rate which activates the injector connected to the body of cleaning agent to provide a discharge from the spray device of hot water and cleaning agent, terminating the flow at the first rate, providing a flow through the spray device from the source of hot water through the first conduit at a second flow rate less than the first flow rate said second rate being insufficient to operate the injector to provide only a discharge of hot water from the spray device, closing the first conduit to the spray device while opening the second conduit to the spray device, providing a flow to the spray device from the source of cold water through the second conduit at a third rate which activates the injector connected to the body of sanitizing agent to provide a discharge through the spray device of cold water and sanitizing agent, and terminating flow through the spray device.

2. A method of cleaning and sanitizing equipments which are used in preparing, handling, storing, and displaying food, the method utilizing an apparatus having a single spray device having a valve to adjustably control flow therethrough, said spray device being connected to a fitting which is connected by a pair of conduits to both a source of hot water and a source of cold water, each of the pair of conduits having a valve means and means for introducing an agent into water flowing therethrough, said means for introducing an agent into said conduit connected to a source of hot water comprising a source of cleaning agent and said means for introducing an agent into said conduit connected to a source of cold water comprising a source of sanitizing agent, each of said means being operable only when the water flow in the conduit exceeds a given rate of flow, said method comprising the steps of selectively opening and closing the valve means of the conduits to provide hot water to the spray device, opening the valve of the spray device to provide a rate of flow at least as great as said given rate of flow therethrough to activate the means for introducing a cleaning agent into the flow of hot water flowing through the conduit to provide a mixture of hot water and cleaning agent to the spray device, spraying the surface of the equipment with the mixture of hot water and cleaning agent to clean the equipment, adjusting the rate of flow through the spray device to create a rate of flow in the conduit less than the given rate to provide the spray nozzle with a flow of hot water free of said cleaning agent, spraying the surfaces of the equipment with the water free of agent to rinse the equipment, selectively opening and closing the valve means to provide a flow of cold water to the spray device, adjusting the flow of water through the spray device to obtain a rate of flow exceeding the given rate of flow to activate the means for introducing a sanitizing agent in the flow of cold water to provide a mixture of cold water and sanitizing agent to the spray device, and spraying the surfaces of the equipment with the mixture of cold water and sanitizing agent to sanitize the surfaces of the equipment.

3. A method according to claim 2, which includes the step of rinsing the equipment with hot water to flush accumulation of dirt from a surface thereof prior to the step of opening the valve of the spray device to obtain a rate of flow therethrough to activate said introducing means for the hot water conduit.

References Cited
UNITED STATES PATENTS

| | | | |
|---|---|---|---|
| 2,558,628 | 6/1951 | Redin | 134—26 X |
| 2,930,721 | 3/1960 | Tuthill | 134—26 X |
| 3,589,378 | 6/1971 | Swanson | 134—100 X |
| 3,613,997 | 10/1971 | Thompson | 239—310 |
| 3,383,044 | 5/1968 | Norstrud et al. | 239—310 X |
| 3,118,610 | 1/1964 | Techler | 239—310 X |
| 3,429,508 | 2/1969 | Russinik | 239—414 X |
| 1,667,683 | 4/1928 | Thompson et al. | 21—107 X |
| 3,236,248 | 2/1966 | Ray | 134—24 X |
| 3,226,030 | 12/1965 | Rossi | 239—410 X |
| 3,598,322 | 8/1971 | Miller et al. | 239—410 |

BARRY S. RICHMAN, Primary Examiner

U.S. Cl. X.R.

21—107; 134—24, 26, 36, 94, 98, 100, 168 R, 172, 198; 137—604; 239—310, 410, 414, 415, 527